United States Patent
Tsai

(10) Patent No.: US 6,538,342 B1
(45) Date of Patent: Mar. 25, 2003

(54) POWER SUPPLY WITH ONLY FEEDFORWARD IN PRIMARY AND MULTIPLE SECONDARIES

(75) Inventor: Kuei-Hsiang Tsai, Jungli (TW)

(73) Assignee: Deep & Far, Taipei (TW)

( * ) Notice: Subject to any disclaimer, the term of this patent is extended or adjusted under 35 U.S.C. 154(b) by 0 days.

(21) Appl. No.: 10/037,416

(22) Filed: Jan. 4, 2002

(51) Int. Cl.⁷ .................................................. H02J 1/00
(52) U.S. Cl. .......................................... 307/34; 307/33
(58) Field of Search ............................. 307/33, 34, 38, 307/31, 39

(56) References Cited

U.S. PATENT DOCUMENTS 5,349,515 A * 9/1994 Megeid ................... 363/21.11
6,301,128 B1 * 10/2001 Jang et al. .................... 363/17
6,314,002 B1 * 11/2001 Qian et al. ................ 363/21.04
6,351,403 B2 * 2/2002 Abdoulin ..................... 307/31

* cited by examiner

Primary Examiner—Shawn Riley
(74) Attorney, Agent, or Firm—Benesch, Friedlander, Coplan & Aronoff, LLP

(57) ABSTRACT

A multiple output power supply with a constant volt-second clamp circuit is provided. The multiple output power supply includes a transformer having a primary winding electrically connected to a supply voltage and at least two secondary windings for providing multiple output voltages, and a constant volt-second clamp circuit electrically connected to the primary winding for achieving a constant volt-second product clamp over a varying input voltage at the primary winding where the constant volt-second product clamp over the varying input voltage at the primary winding is independent of a load effect of the secondary windings.

12 Claims, 5 Drawing Sheets

POWER SUPPLY WITH ONLY FEEDFORWARD IN PRIMARY AND MULTIPLE SECONDARIES

FIELD OF THE INVENTION

The present invention relates to a multiple output power supply for providing stable multiple output voltages, and especially to a multiple output power supply with a constant volt-second clamp circuit for providing stable multiple output voltages.

BACKGROUND OF THE INVENTION

FIG. 1 shows a multiple output power supply according to the prior art. Please refer to FIG. 1. A typical multiple output power supply includes a voltage supply 1, a transformer 2, a feedback controller 3, and a post regulator 4. The voltage supply 1 provides a supply voltage for the multiple output power supply. The transformer 2 includes a primary winding 21 and at least two secondary windings 22 for providing multiple output voltages. The post regulator 4 is electrically connected to the secondary windings 22 for providing stable output voltages. The feedback controller 3 is electrically connected to the secondary windings 22 for feeding back output voltages in order to control a duty cycle of an input voltage at the primary winding 21 of the transformer 2. If the output voltages increases, the duty cycle will decrease to stabilize the output voltages. The feedback controller 3 will adjust the duty cycle of the input voltage at the primary winding 21 of the transformer 2 if there are variations at any one of the output voltages. However, it is not necessary for the other output voltages to adjust the duty cycle of the input voltage at the primary winding 21 of the transformer 2 for compensating the variations at one of the output voltages if there are variations at one of the output voltages. Thereby, the over-compensating effect will occur where the voltage across the post regulators 4 and the power dissipation at the post regulators 4 are increased. The over-voltage across the post regulators 4 increases the possibility of damage to the post regulators 4.

It is therefore attempted by the applicant to deal with the above situation encountered by the prior art.

SUMMARY OF THE INVENTION

It is therefore an object of the present invention to propose a multiple output power supply with a constant volt-second clamp circuit for maintaining a constant volt-second product at the input voltage, which is independent of the load effect of output voltages and variations in input voltages.

According to an aspect of the present invention, a multiple output power supply for providing stable multiple output voltages includes a transformer having a primary winding electrically connected to a supply voltage terminal and at least two secondary windings for providing multiple output voltages, and a constant volt-second clamp circuit electrically connected to the primary winding for achieving a constant volt-second product clamp over a varying input voltage at the primary winding, in which the constant volt-second product clamp over the varying input voltage at the primary winding is independent of a load effect of the secondary windings.

Preferably, the secondary winding is electrically connected to a post regulator.

Preferably, the post regulator is a magnetic amplifier regulator.

Preferably, the post regulator is a synchronization rectifier.

Preferably, the post regulator is a linear regulator.

Preferably, the constant volt-second clamp circuit includes a sawtooth wave generator for providing a sawtooth wave that increases linearly as a function of time with a slope which is proportional to a supply voltage, a clock generator for providing a timing signal, a first transistor switch having a control electrode electrically connected to the clock generator, a first conduction electrode electrically connected to ground, and a second conduction electrode electrically connected to the sawtooth wave generator for being turned on when the timing signal is at a low voltage level and turned off when the timing signal is at a high voltage level so that the sawtooth wave generator outputs the sawtooth wave when the timing signal is at the low voltage level, a comparator having a noninverting terminal electrically connected to a first voltage, and an inverting terminal electrically connected to an output of the sawtooth wave generator, a first NOR gate having a terminal electrically connected to an output of the clock generator, and the other terminal electrically connected to an output of the comparator, a second NOR gate having a terminal electrically connected to the output of the clock generator, and the other terminal electrically connected to an output of the first NOR gate, and a second transistor switch having a control electrode electrically connected to an output of the second NOR gate, a first conduction electrode electrically connected to one end of the primary winding of the transformer, and a second conduction electrode electrically connected to one end of the supply voltage terminal.

Preferably, the first transistor switch is a bipolar junction transistor (BJT).

Preferably, the second transistor switch is a metal oxide semiconductor field effect transistor (MOSFET).

Preferably, the sawtooth wave generator includes a resistor having one end electrically connected to said supply voltage, and a capacitor having one end electrically connected to the other end of the resistor to form a node that is the output of the sawtooth wave generator, and the other end electrically connected to ground.

Preferably, the constant volt-second clamp circuit includes a sawtooth wave generator for providing a sawtooth wave that increases linearly as a function of time with a slope which is proportional to the supply voltage, a pulse width modulation (PWM) generator for providing a pulse width modulation signal, a diode having a cathode end electrically connected to an output of the pulse width modulation generator, and an anode electrically connected to an output of the sawtooth wave generator for being turned on when the pulse width modulation signal is at a low level voltage and turned off when the pulse width modulation signal is at a high level voltage so that the sawtooth wave generator outputs the sawtooth wave when the pulse width modulation signal is at the high level voltage, a comparator having a noninverting terminal electrically connected to a first voltage level, and an inverting terminal electrically connected to an output of the sawtooth wave generator, a first transistor switch having a control electrode electrically connected to an output of the comparator, a first conduction electrode electrically connected to an output of the pulse width modulation generator, and a second conduction electrode electrically connected to ground, a push-pull circuit having an input terminal electrically connected to the first conduction electrode of the first transistor switch, and a second transistor switch having a control electrode electrically connected to an output of the push-pull circuit, a first conduction electrode electrically connected to one end of the supply voltage terminal, and a second conduction electrode electrically connected to one end of the primary winding.

Alternatively, the constant volt-second clamp circuit includes a pulse width modulation (PWM) generator for providing a pulse width modulation signal, a peak holding circuit electrically connected to one end of said secondary windings for obtaining a voltage, a sawtooth wave generator for providing a sawtooth wave that increases linearly as a function of time with a slope which is proportional to the supply voltage, a diode having a diode having an anode end electrically connected to an output of the sawtooth wave generator, and a cathode end electrically connected to an output of the pulse width modulation generator for being turned on when the pulse width modulation signal is at a low level voltage and turned off when the pulse width modulation signal is at a high level voltage so that the sawtooth wave generator outputs the sawtooth wave when the pulse width modulation signal is at the high level voltage, a comparator having an inverting terminal electrically connected a voltage level, and a noninverting terminal electrically connected to an output of the sawtooth wave generator, a first transistor switch having a control electrode electrically connected to an output of the comparator, a first conduction electrode electrically connected to ground, and a second conduction electrode electrically connected to an output of the pulse width modulation generator, a push-pull circuit having an input terminal electrically connected the second conduction electrode of the first transistor switch, an isolated transformer having a secondary winding electrically connected to an output of the push-pull circuit, and a second transistor switch having a control electrode electrically connected to one end of a primary winding of the isolated transformer, a first conduction electrode electrically connected to the other end of the primary winding of the isolated transformer, and a second conduction electrode electrically connected to one end of the primary winding of the transformer.

Preferably, the peak holding circuit includes a first diode having an anode end electrically connected to one end of the secondary winding of the transformer, and a first capacitor having one end electrically connected to a cathode end of the first diode for forming a node which is an output of the peak holding circuit, and the other end electrically connected to ground.

The present invention may best be understood through the following description with reference to the accompanying drawings, in which:

DETAILED DESCRIPTION OF THE PREFERRED EMBODIMENT

Figure 1:
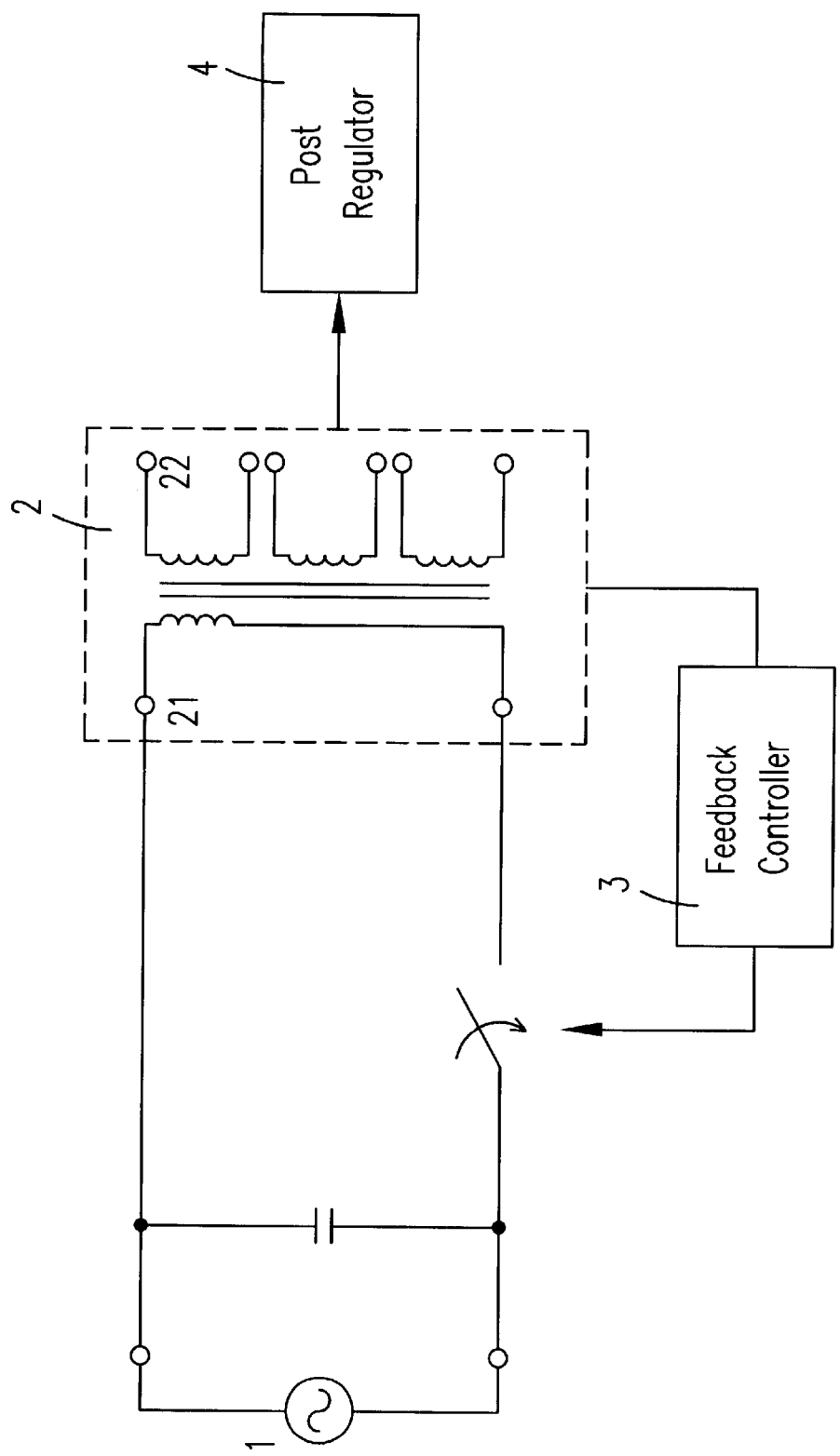
FIG. 1 illustrates a multiple output power supply according to the prior art.
Figure 2A:
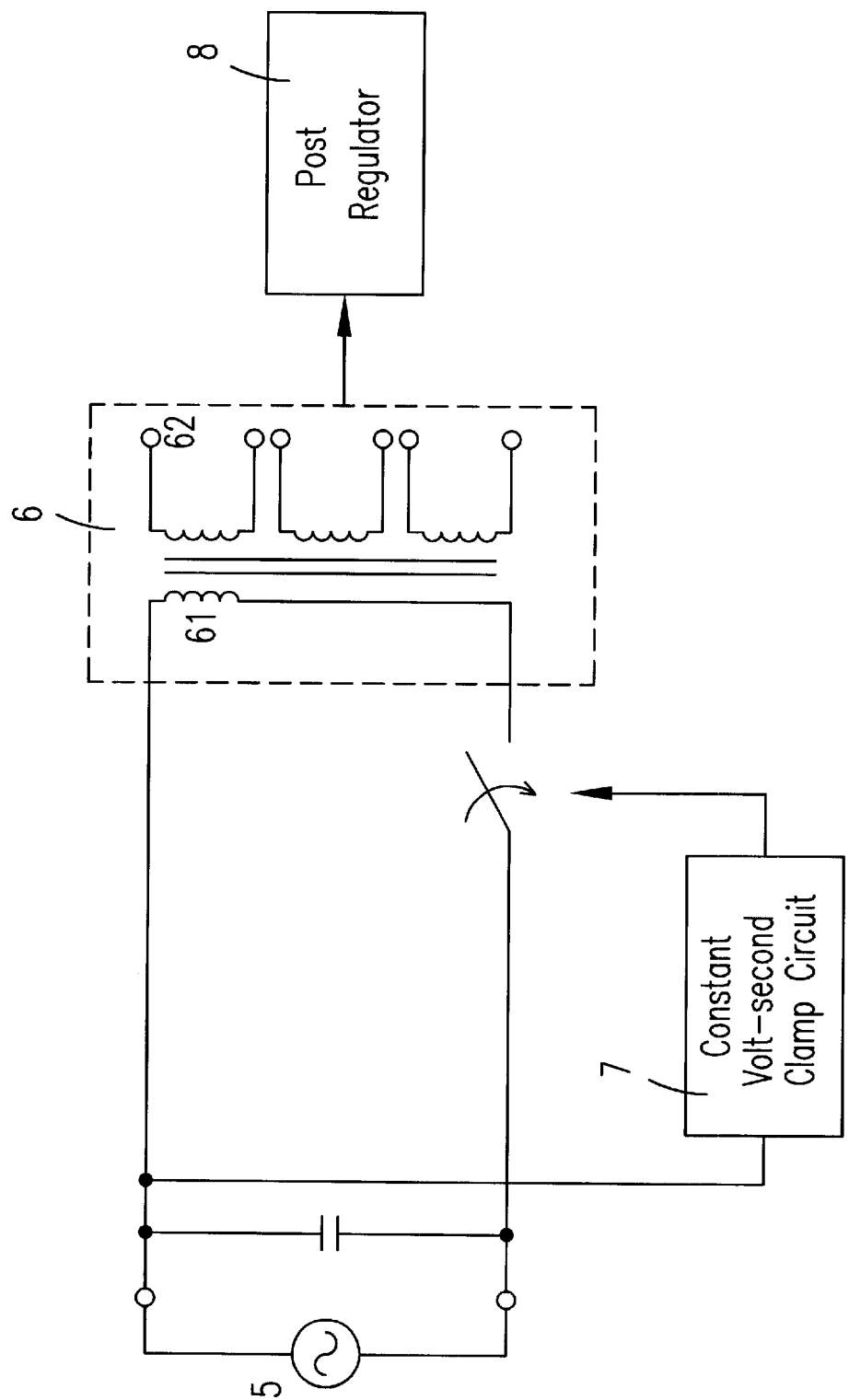
FIG. 2(a) is a block diagram illustrating a multiple output power supply with a constant volt-second clamp circuit according to a first preferred embodiment of the present invention.

FIG. 2(a) is a block diagram illustrating a multiple output power supply with a constant volt-second clamp circuit according to a first preferred embodiment of the present invention. As shown in FIG. 2(a), a multiple output power supply for providing stable multiple output voltages includes a transformer 6, a constant volt-second clamp circuit 7, and a post regulator 8. The transformer 6 has a primary winding 61 electrically connected to a supply voltage 5 and at least two secondary windings 62 for providing multiple output voltages. The constant volt-second clamp circuit 7 electrically connected to the primary winding 61 for achieving a constant volt-second product clamp over a varying input voltage at the primary winding 61. In other words, the constant volt-second clamp circuit 7 controls a duty cycle of an input voltage at the primary winding 61 in order to achieve a constant volt-second product clamp over the input voltage at the primary winding 61. If the supply voltage 5 increases, the duty cycle will be decreased to maintain the constant volt-second product. At the same time, the constant volt-second product clamp over the input voltage at the primary winding 61 is independent of a load effect of the secondary windings 62. The post regulator 8 is electrically connected to the secondary windings 62 of the transformer 6.

Figure 2B:
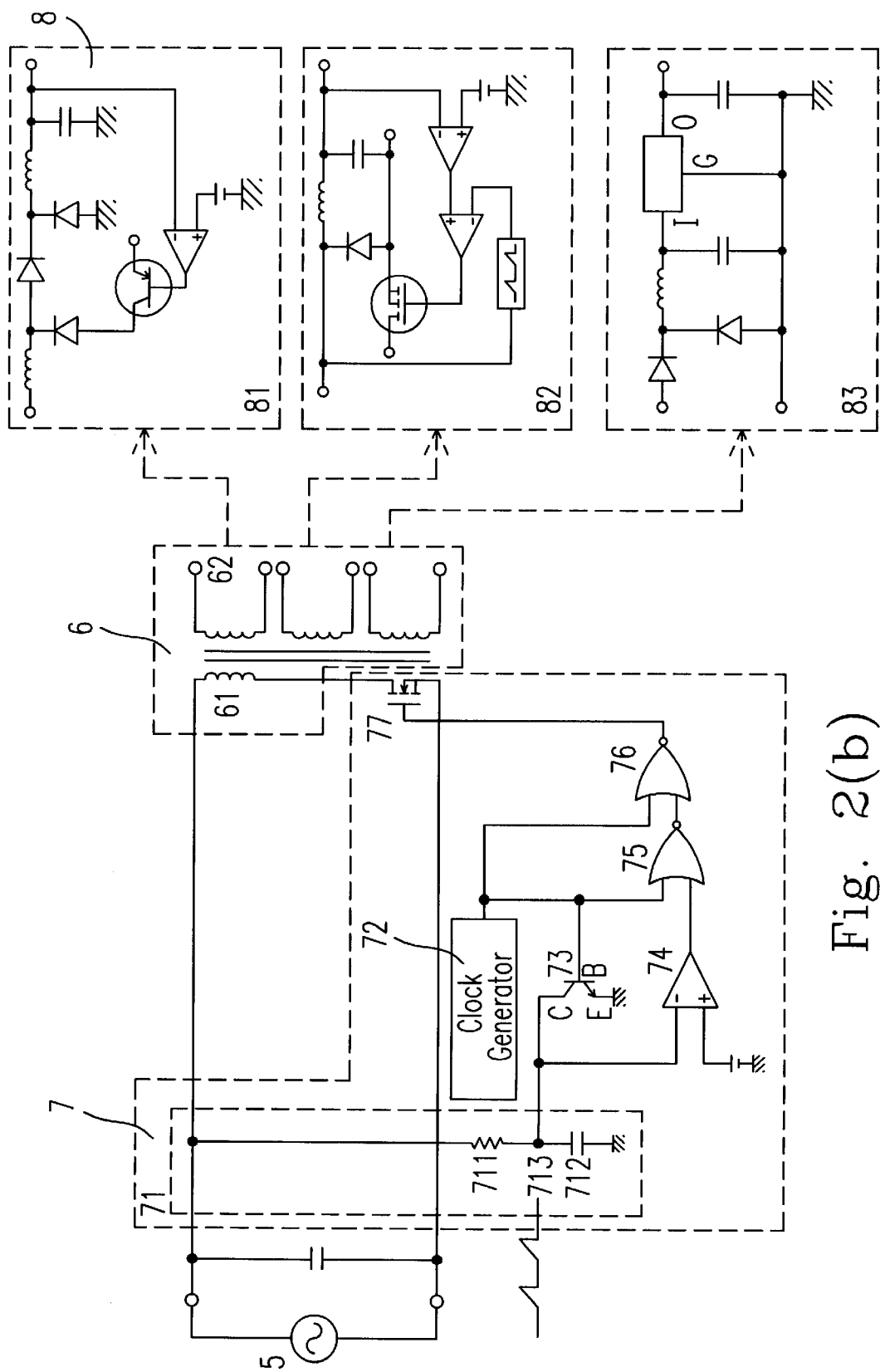
FIG. 2(b) is a schematic diagram illustrating a multiple output power supply with a constant volt-second clamp circuit according to a first preferred embodiment of the present invention.

FIG. 2(b) is a schematic diagram illustrating a multiple output power supply with a constant volt-second clamp circuit according to a first preferred embodiment of the present invention. As shown in FIG. 2(b), the constant volt-second clamp circuit 7 includes a sawtooth wave generator 71, a clock generator 72, a first transistor switch 73, a comparator 74, a first NOR gate 75, a second NOR gate 76, and a second transistor switch 77. The sawtooth wave generator 71 provides a sawtooth wave that increases linearly as a function of time with a slope which is proportional to a supply voltage. The clock generator 72 provides a timing signal. The first transistor switch 73 has a control electrode electrically connected to the clock generator 72, a first conduction electrode electrically connected to ground, and a second conduction electrode electrically connected to the sawtooth wave generator 71 for being turned on when the timing signal is at a low voltage level and turned off when the timing signal is at a high voltage level so that the sawtooth wave generator outputs the sawtooth wave when the timing signal is at the low voltage level. In general, the low voltage level is at about zero voltage. The high voltage level is at about 5 volts. The comparator 74 has a noninverting terminal electrically connected to a first voltage, and an inverting terminal electrically connected to an output of the sawtooth wave generator 7. The first NOR gate 75 has a terminal electrically connected to an output of the clock generator 72, and the other terminal electrically connected to an output of the comparator 74. The second NOR gate 76 has a terminal electrically connected to the output of the clock generator 72, and the other terminal electrically connected to an output of the first NOR gate 75. And, the second transistor switch 77 has a control electrode electrically connected to an output of the second NOR gate 76, a first conduction electrode electrically connected to one end of the primary winding 61 of the transformer 6, and a second conduction electrode electrically connected to one end of the supply voltage 5.

Meanwhile, the first transistor switch 73 can be a bipolar junction transistor (BJT). The second transistor switch 77 can be a metal oxide semiconductor field effect transistor (MOSFET). The sawtooth wave generator includes a resistor 711, and a capacitor 721. The resistor 711 has one end electrically connected to the supply voltage 5. And, the capacitor 712 has one end electrically connected to the other end of the resistor 711 to form a node 713 that is the output of the sawtooth wave generator 71, and the other end electrically connected to ground. However, the post regulator 8 can be a magnetic amplifier regulator 81, or a magnetic amplifier regulator 82, or a linear regulator 83.

Figure 3:
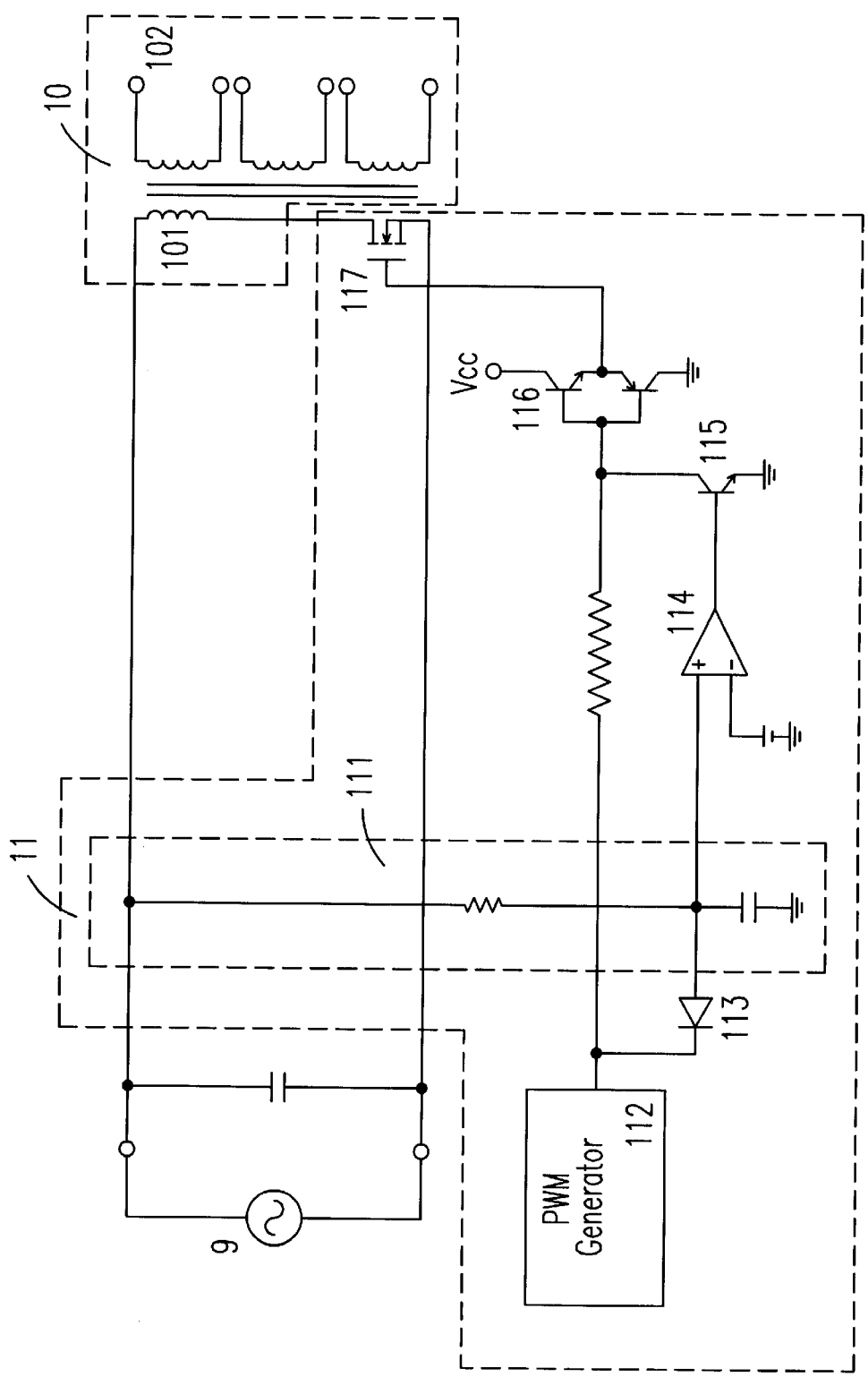
FIG. 3 is a schematic diagram illustrating a multiple output power supply with a constant volt-second clamp circuit according to a second preferred embodiment of the present invention.

FIG. 3 is a schematic diagram illustrating a multiple output power supply with a constant volt-second clamp circuit according to a second preferred embodiment of the present invention. As shown in FIG. 3, the multiple output power supply for providing stable multiple output voltages includes a transformer 10, and a constant volt-second clamp circuit 11. The transformer 10 has a primary winding 101 electrically connected to a supply voltage 9 and at least two secondary windings 102 for providing multiple output voltages. And, the constant volt-second clamp circuit 11 is electrically connected to the primary winding 101 for achieving a constant volt-second product clamp over a varying input voltage at the primary winding 101 where the constant volt-second product clamp over the input voltage at the primary winding 101 is independent of a load effect of the secondary windings 102.

Meanwhile, the constant volt-second clamp circuit includes a sawtooth wave generator 111, a pulse width modulation (PWM) generator 112, a diode 113, a comparator 114, a first transistor switch 115, a push-pull circuit 116, and a second transistor switch 117. The sawtooth wave generator 111 provides a sawtooth wave that increases linearly as a function of time with a slope which is proportional to the supply voltage 9. The pulse width modulation (PWM) generator 112 provides a pulse width modulation signal. The diode 113 has a cathode end electrically connected to an output of the pulse width modulation generator 112, and an anode end electrically connected to an output of the sawtooth wave generator 111 for being turned on when the pulse width modulation signal is at a low level voltage and turned off when the pulse width modulation signal is at a high level voltage so that the sawtooth wave generator 111 outputs the sawtooth wave when the pulse width modulation signal is at the high level voltage. The comparator 114 has a noninverting terminal electrically connected to a first voltage level, and an inverting terminal electrically connected to an output of the sawtooth wave generator 11. The first transistor switch 115 has a control electrode electrically connected to an output of the comparator 114, a first conduction electrode electrically connected to an output of the pulse width modulation generator 112, and a second conduction electrode electrically connected to ground. The push-pull circuit 116 has an input terminal electrically connected to the first conduction electrode of the first transistor switch 115. And, the second transistor switch 117 has a control electrode electrically connected to an output of the push-pull circuit 116, a first conduction electrode electrically connected to one end of the supply voltage terminal, and a second conduction electrode electrically connected to one end of the primary winding 101.

Figure 4:
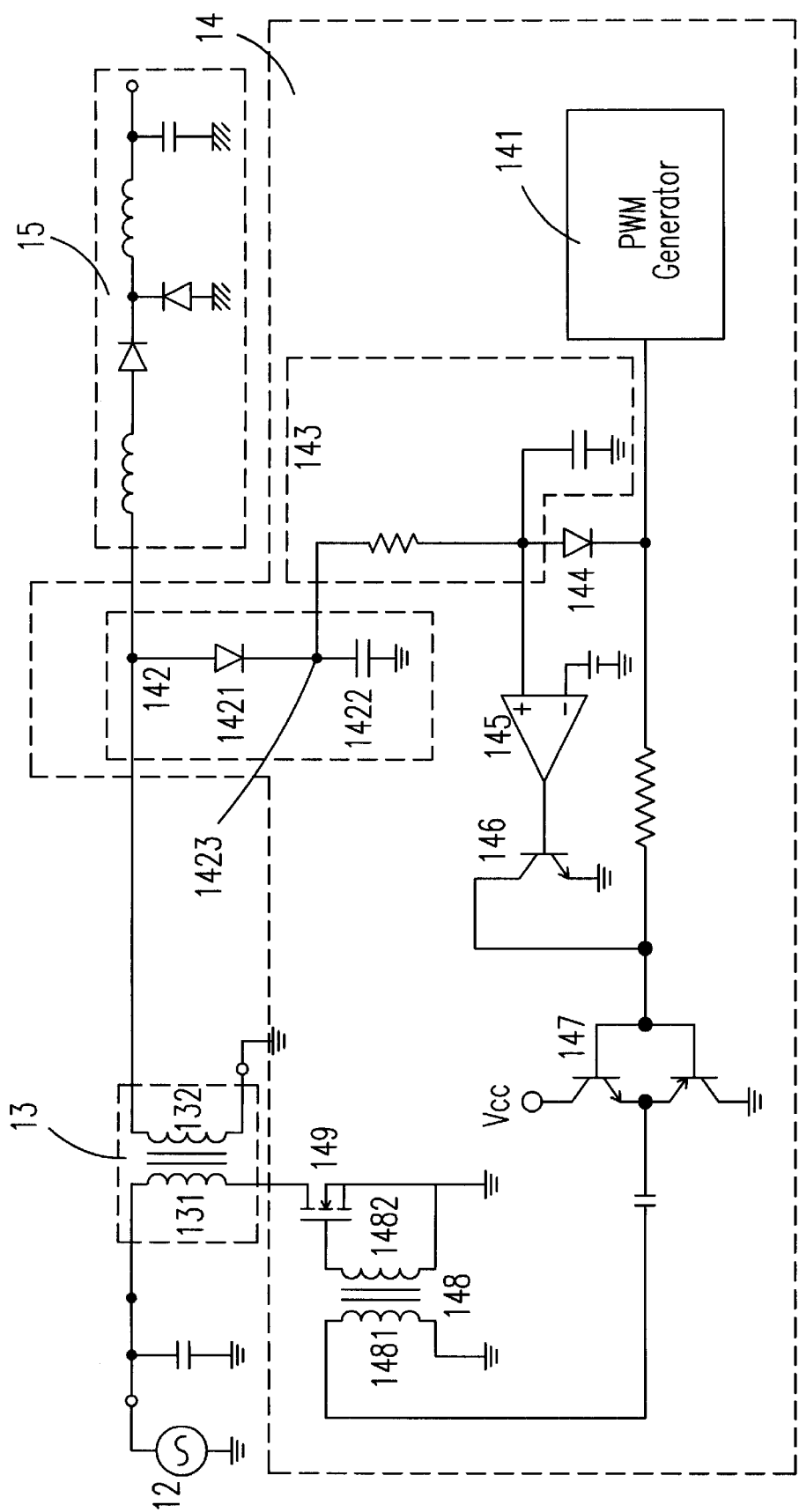
FIG. 4 is a schematic diagram illustrating a multiple output power supply with a constant volt-second clamp circuit according to a third preferred embodiment of the present invention.

FIG. 4 is a schematic diagram illustrating a multiple output power supply with a constant volt-second clamp circuit according to a third preferred embodiment of the present invention. As shown in FIG. 4, a multiple output power supply for providing stable multiple output voltages includes a transformer 13, a constant volt-second clamp circuit 14, and a post regulator 15. The transformer 13 has a primary winding 131 electrically connected to a supply voltage 12 and at least two secondary windings 132 for providing multiple output voltages. And, the constant volt-second clamp circuit 14 is electrically connected to the primary winding 131 for achieving a constant volt-second product clamp over a varying input voltage at the primary winding 131 where the constant volt-second product clamp over the input voltage at the primary winding 131 is independent of a load effect of the secondary windings 132.

Meanwhile, the constant volt-second clamp circuit 14 includes a pulse width modulation (PWM) generator 141, a peak holding circuit 142, a sawtooth wave generator 143, a diode 144, a comparator 145, a first transistor switch 146, a push-pull circuit 147, an isolated transformer 148, and a second transistor switch 149. The pulse width modulation (PWM) generator 141 provides a pulse width modulation signal. The peak holding circuit 142 is electrically connected to one end of the secondary windings 132 for obtaining a voltage. The sawtooth wave generator 143 provides a sawtooth wave that increases linearly as a function of time with a slope which is proportional to the supply voltage 12. The diode 144 has an anode end electrically connected to an output of the sawtooth wave generator 143, and a cathode end electrically connected to an output of the pulse width modulation generator 141 for being turned on when the pulse width modulation signal is at a low level voltage and turned off when the pulse width modulation signal is at a high level voltage so that the sawtooth wave generator 143 outputs the sawtooth wave when the pulse width modulation signal is at the high level voltage. The comparator 145 has an inverting terminal electrically connected to a voltage level, and a noninverting terminal electrically connected to an output of the sawtooth wave generator 143. The first transistor switch 146 has a control electrode electrically connected to an output of the comparator 145, a first conduction electrode electrically connected to ground, and a second conduction electrode electrically connected to an output of the pulse width modulation generator 141. The push-pull circuit 147 has an input terminal electrically connected to the second conduction electrode of the first transistor switch 146. The isolated transformer 148 has a secondary winding 1481 electrically connected to an output of the push-pull circuit 147. And, the second transistor switch 149 has a control electrode electrically connected to one end of a primary winding 1482 of the isolated transformer 148, a first conduction electrode electrically connected to the other end of the primary winding 1481 of the isolated transformer 148, and a second conduction electrode electrically connected to one end of the primary winding 131 of the transformer 13.

Further, the peak holding circuit 142 includes a first diode 1421, and a first capacitor 1422. The first diode 1421 has an anode end electrically connected to one end of the secondary winding 132 of the transformer 13. And, the first capacitor 1422 has one end electrically connected to a cathode end of the first diode 1421 for forming a node 1423 which is an output of the peak holding circuit 142, and the other end electrically connected to ground.

Owing to the above descriptions, the multiple output power supply with a constant volt-second clamp circuit can maintain a constant volt-second product at the input voltage under variations in output voltages or input voltages. Therefore, the invention can assure that the multiple output power supply can provide a constant volt-second product at the input voltage, which is independent of load effect of output voltages.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multiple output power supply for providing stable multiple output voltages, comprising:
   a transformer having a primary winding electrically connected to a supply voltage terminal and at least two secondary windings for providing multiple output voltages; and
   a constant volt-second clamp circuit electrically connected to said primary winding for achieving a constant volt-second product clamp over a varying input voltage at said primary winding, wherein said constant volt-second product clamp over said varying input voltage at said primary winding is independent of a load effect of said secondary windings.

2. The multiple output power supply according to claim 1, wherein said secondary winding is electrically connected to a post regulator.

3. The multiple output power supply according to claim 2, wherein said post regulator is a magnetic amplifier regulator.

4. The multiple output power supply according to claim 2, wherein said post regulator is a synchronization rectifier.

5. The multiple output power supply according to claim 2, wherein said post regulator is a linear regulator.

6. The multiple output power supply according to claim 1, wherein said constant volt-second clamp circuit comprises:
   a sawtooth wave generator for providing a sawtooth wave that increases linearly as a function of time with a slope which is proportional to a supply voltage;
   a clock generator for providing a timing signal;
   a first transistor switch having a control electrode electrically connected to said clock generator, a first conduction electrode electrically connected to ground, and a second conduction electrode electrically connected to said sawtooth wave generator for being turned on when said timing signal is at a low voltage level and turned off when said timing signal is at a high voltage level so that said sawtooth wave generator outputs said sawtooth wave when said timing signal is at said low voltage level;
   a comparator having a noninverting terminal electrically connected to a first voltage, and an inverting terminal electrically connected to an output of said sawtooth wave generator;
   a first NOR gate having a terminal electrically connected to an output of said clock generator, and the other terminal electrically connected to an output of said comparator;
   a second NOR gate having a terminal electrically connected to said output of said clock generator, and the other terminal electrically connected to an output of said first NOR gate; and
   a second transistor switch having a control electrode electrically connected to an output of said second NOR gate, a first conduction electrode electrically connected to one end of said primary winding of said transformer, and a second conduction electrode electrically connected to one end of said supply voltage terminal.

7. The multiple output power supply according to claim 6, wherein said first transistor switch is a bipolar junction transistor (BJT).

8. The multiple output power supply according to claim 6, wherein said second transistor switch is a metal oxide semiconductor field effect transistor (MOSFET).

9. The multiple output power supply according to claim 6, wherein said sawtooth wave generator comprises:
   a resistor having one end electrically connected to said supply voltage; and
   a capacitor having one end electrically connected to the other end of said resistor to form a node that is said output of said sawtooth wave generator, and the other end electrically connected to ground.

10. The multiple output power supply according to claim 1, wherein said constant volt-second clamp circuit comprises:
    a sawtooth wave generator for providing a sawtooth wave that increases linearly as a function of time with a slope which is proportional to said supply voltage;
    a pulse width modulation (PWM) generator for providing a pulse width modulation signal;
    a diode having a cathode end electrically connected to an output of said pulse width modulation generator, and an anode end electrically connected to an output of said sawtooth wave generator for being turned on when said pulse width modulation signal is at a low level voltage and turned off when said pulse width modulation signal is at a high level voltage so that said sawtooth wave generator outputs said sawtooth wave when said pulse width modulation signal is at said high level voltage;
    a comparator having a noninverting terminal electrically connected to a first voltage level, and an inverting terminal electrically connected to an output of said sawtooth wave generator;
    a first transistor switch having a control electrode electrically connected to an output of said comparator, a first conduction electrode electrically connected to an output of said pulse width modulation generator, and a second conduction electrode electrically connected to ground;
    a push-pull circuit having an input terminal electrically connected to said first conduction electrode of said first transistor switch; and
    a second transistor switch having a control electrode electrically connected to an output of said push-pull circuit, a first conduction electrode electrically connected to one end of said supply voltage terminal, and a second conduction electrode electrically connected to one end of said primary winding.

11. The multiple output power supply according to claim 1, wherein said constant volt-second clamp circuit comprises:
    a pulse width modulation (PWM) generator for providing a pulse width modulation signal;
    a peak holding circuit electrically connected to one end of said secondary windings for obtaining a voltage;
    a sawtooth wave generator for providing a sawtooth wave that increases linearly as a function of time with a slope which is proportional to said supply voltage;
    a diode having an anode end electrically connected to an output of said sawtooth wave generator, and a cathode end electrically connected to an output of said pulse width modulation generator for being turned on when said pulse width modulation signal is at a low level voltage and turned off when said pulse width modulation signal is at a high level voltage so that said sawtooth wave generator outputs said sawtooth wave when said pulse width modulation signal is at said high level voltage;

a comparator having an inverting terminal electrically connected a voltage level, and a noninverting terminal electrically connected to an output of said sawtooth wave generator;

a first transistor switch having a control electrode electrically connected to an output of said comparator, a first conduction electrode electrically connected to ground, and a second conduction electrode electrically connected to an output of said pulse width modulation generator;

a push-pull circuit having an input terminal electrically connected said second conduction electrode of said first transistor switch;

an isolated transformer having a secondary winding electrically connected to an output of said push-pull circuit; and a second transistor switch having a control electrode electrically connected to one end of a primary winding of said isolated transformer, a first conduction electrode electrically connected to the other end of said primary winding of said isolated transformer, and a second conduction electrode electrically connected to one end of said primary winding of said transformer.

12. The multiple output power supply according to claim 11, wherein said peak holding circuit comprises:

a first diode having an anode end electrically connected to one end of said secondary winding of said transformer; and a first capacitor having one end electrically connected to a cathode end of said first diode for forming a node which is an output of said peak holding circuit, and the other end electrically connected to ground.

* * * * *